Oct. 25, 1960     O. L. WESTGATE     2,957,612
CONDIMENT DISPENSER
Filed March 25, 1957
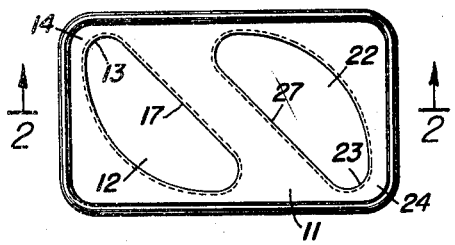
FIG. 1.
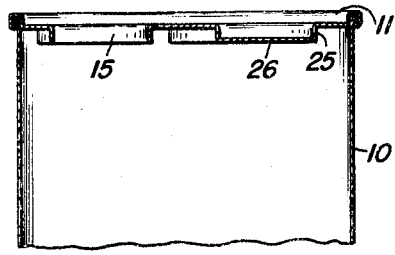
FIG. 2.
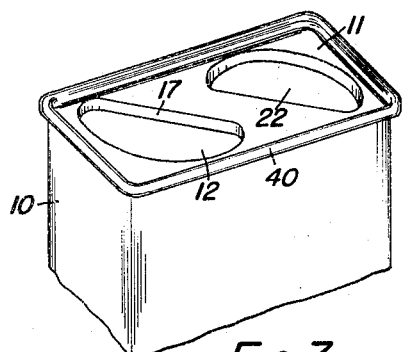
FIG. 3.
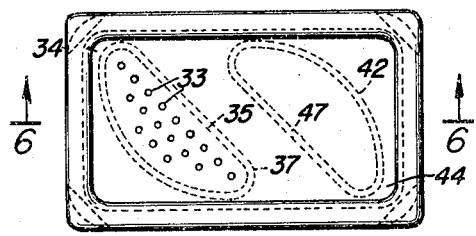
FIG. 4.
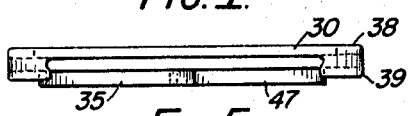
FIG. 5.
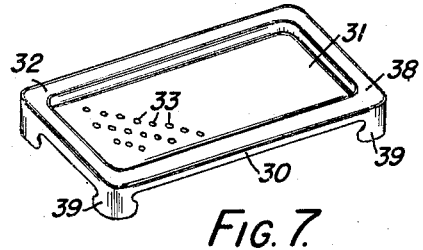
FIG. 7.
FIG. 6.
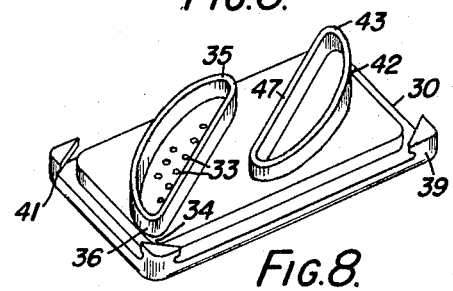
FIG. 8.
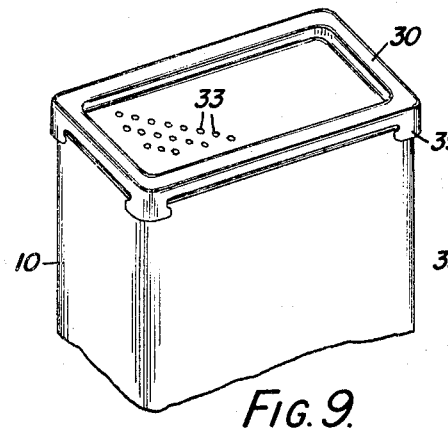
FIG. 9.
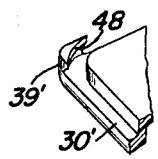
FIG. 10.
INVENTOR.
OSCAR L. WESTGATE
BY
ATTORNEY

United States Patent Office 2,957,612
Patented Oct. 25, 1960

2,957,612

CONDIMENT DISPENSER

Oscar L. Westgate, Pittsford, N.Y., assignor to The R. T. French Company, Rochester, N.Y., a corporation of Delaware Filed Mar. 25, 1957, Ser. No. 648,036

6 Claims. (Cl. 222—480)

The present invention relates to condiment cans, such as are intended for household use in dispensing condiments such as pepper, grated cinnamon, grated nutmeg, and the like.

The conventional condiment can is closed at its upper end by a cap which has a slot through it; and there is a slide mounted on top of the cap which has one area provided with a plurality of perforations, and another area provided with a slot. By moving the slide to bring its perforated area into registry with the slot in the cap, the condiment can be dispensed from the can by shaking the can. By moving the slotted area of the slide into registry with the slot in the cap, the condiment can be poured from the can in bulk.

The conventional condiment cans of this type have many objectionable features. The slide tends to stick with the result that the housewife may break her fingernails while attempting to force the slide from one position to another. Moreover, when the slot of the slide is in registry with the slot of the cap, it is difficult to pour condiment into a receptacle, such as a table pepper shaker or a measuring spoon, without wasting considerable of the condiment. Conventional condiment cans are also difficult to seal to prevent spilling of condiment from the can in event the can is knocked over. Moreover, there is little space on the conventional condiment can for marking the price of the can as required for sale in a supermarket or the like.

The purpose of the present invention is to provide a condiment can for ordinary household use which will avoid the objections to conventional constructions.

To this end, one object of the invention is to provide an improved condiment can which will enable the condiment readily to be poured out of the can without waste.

Another object of the invention is to provide a condiment can which will assist the user in pouring a precisely measured quantity of condiment from the can.

Another object of the invention is to provide a condiment can which has a readily-shiftable cap which can be moved by the user without difficulty and without any danger of breaking the fingernails or scratching the hands, and which can readily be positioned to permit of either sifting the condiment from the can or of pouring it from the can.

Another object of the invention is to provide a condiment can which can be readily stamped with the price of the can in a clearly visible position.

Still another object of the invention is to provide a condiment can having a cap which will seal the can completely when in closed position.

Other objects of the invention will be apparent hereinafter from the specification and from the recital of the appended claims.

In the drawing:

Fig. 1 is a plan view, with its cap removed, of a condiment can made according to one embodiment of this invention;

Fig. 2 is a fragmentary vertical section through this can taken on the line 2—2 of Fig. 1, looking in the direction of the arrows;

Fig. 3 is a perspective view of the can looking at the top thereof, but again with the cap removed;

Fig. 4 is a plan view of the can with the cap in position thereon;

Fig. 5 is a side elevation of the cap;

Fig. 6 is a section through the cap taken on the line 6—6 of Fig. 4, looking in the direction of the arrows;

Fig. 7 is a top perspective view of the cap;

Fig. 8 is a perspective view showing the cap inverted and looking at its bottom;

Fig. 9 is a fragmentary perspective view of the condiment can with the cap in position thereon; and Fig. 10 is a fragmentary perspective view showing a somewhat modified cap, inverted and looking at its bottom.

In the embodiment of the invention shown in the drawings, 10 denotes the body of the can. The can shown is rectangular in cross-section; and its body may be made of pasteboard, or metal, or even of plastic.

The top of the can is denoted at 11. As shown, the top is made of metal and is crimped around its marginal edge over the top edge of the side of the can to secure it to the body of the can. The top has a generally crescent-shaped opening 12 formed in it, which is disposed generally diagonally of the top and one end 13 (Fig. 1) of which is adjacent one corner 14 of the top. The opening 12 is preferably formed by punching the top 11 in such manner as to form a flange 15 (Fig. 2) around the opening 12 that extends downwardly and forms the bounding wall of the slot 12.

The top is also formed with a crescent-shaped depression 22 (Fig. 1) also extending diagonally of the top of the can and having its end 23 adjacent the corner 24 of the can diagonally opposite the corner 14. The depression or recess 22 is bounded by the side wall 25 (Fig. 2) and is closed at its bottom 26. The crescent-shaped opening and the crescent-shaped depression are alike in shape and have substantially equal areas. The portion 17 (Fig. 1) of the bounding flange 15 of the crescent shaped opening 12, which is adjacent the depression 22, is straight and parallel to the adjacent straight portion 27 of the bounding wall 25 of the depression.

The can is adapted to be capped by a removable cap 30 which is made of a suitable plastic, such as polyethylene, and which may be coated with a suitable material to improve the vapor lock when the cap is in position. The top is rectangular in shape to correspond to the shape of the can. Its top surface 31 is smooth, but is surrounded on all four sides by a marginal rib 32, whose upper surface is in a plane above and parallel to the plane surface 31.

The cap is provided over part of its area with a plurality of perforations 33 which are arranged in a generally crescent shape. The undersurface of the cap is formed beneath and around the perforations with an integral, depending, generally crescent shaped skirt 35. This crescent-shaped skirt, and the crescent-shaped perforated area itself extend in a direction generally diagonal of the cap; and one end 36 of the crescent-shaped skirt is adjacent one corner 34 (Fig. 8) of the cap. The cap is also provided with a second crescent-shaped skirt 42 that depends from the bottom surface of the cap and that also extends diagonally of the cap. One end of this crescent-shaped skirt 42, is adjacent to the corner 44 (Fig. 4) of the cap diagonally opposite corner 34. The inside wall 37 (Fig. 4) of the crescent-shaped skirt 35 is straight and parallel to the inside wall 47 of the crescent-shaped skirt 42. The crescent-shaped skirts 35 and 42 are of the same shape and have the same general location as the crescent-shaped walls 15 and 25 of the crescent-shaped opening 12 and recess 22 of the top of the can, and are adapted to fit tightly in the opening 12 and recess 22.

The cap member 30 is provided in its four corners with resilient gripping portions 39 (Fig. 8), which are adapted to be engaged resiliently over the crimp or beading 40 of the top of the can to hold the cap on the can. The gripping portions 39 engage under the rounded corners of the beading 40. The depending gripping portions 39 may be undercut, as denoted at 41, more readily to engage over this beading 40.

When the can is shipped from the factory the can is closed; and whenever the can is closed, the cap is positioned on the can so that the skirt 35 fits in the closed recessed portion 22 of the top of the can and so that the skirt 42 fits in the slot 12 of the can. Thereby the perforations 33 in the cap 30 will register with the closed bottom 26 (Fig. 2) of the recess 22 so that none of the contents of the can can spill out or be shaken out through the perforations 33 in the cap. Thereby, also, the hole 12 in the top of the can will be closed by the solid portion of the cap that is bounded by the skirt 42. Because of its inherent resilience the cap will be held securely on the can.

Because of its large flat area 31, the cap 30 can readily be stamped when received in the grocery store or supermarket to show the retail sales price of the can.

If the householder or other purchaser or user of the can wants to use some of the contents of the can, the resilient cap 30 is easily lifted off the top of the can. If it is desired to use the can as a shaker to shake some of the contents of the can on a foodstuff, the cap 30 is turned end for end so that skirt 35 will fit into slot 12 in the top of the can and the skirt 42 will fit in the recess 22; and the cap will be pushed down onto the top of the can again. Thereby the perforations 33 in the cap will be brought into registry with the slot 12 in the top of the can; and the cap is held securely resiliently on the can.

If the user wants to dispense the contents of the can in bulk, the cap 30 is removed completely from the can. The contents of the can can then be dispensed out of the corner 13 of slot 12 by tilting the can toward that corner, or a teaspoon or measuring spoon can be inserted into slot 12 to lift out of the can a desired amount of condiment. Due to its crescent shape, the sides of the flange 15 converge toward the corner 14 of the top of the can so they form a funnel-like portion for dispensing the condiment from the can. The corner 13 of slot 12 is so close to the corner 14 of the can that there is little danger of waste of the contents of the can by spilling, and accurate control over the dispensing operation can be achieved. The straight portion 17 of the flange 15 provides a wiping surface, permits of wiping off a teaspoon or other measuring spoon as it is withdrawn from the slot 12, so that an accurate level teaspoonful of condiment can be obtained. Thus, more accurate quantity measurement is possible, lending itself to more accurate recipe-cooking.

Because the cap is resilient and flexible, danger of the user breaking his or her nails in removing and transposing the cap is eliminated. Because the cap can be made of colored plastic it lends itself readily to colorful design of the can adding to the attractiveness and sales-appeal of the package. Because of the relatively large smooth surface 31 of the cap, moreover, pricemarking is easy and clear. The can is simple and cheap and most advantageous to use.

Fig. 10 illustrates a modified form of cap 30'. Here the resilient gripping portions 39' are undercut, as in the previously described embodiment of the invention, more readily to engage over the beading of the can; but, in addition they also have arcuate inside surfaces 48 corresponding in curvature to the contour of the rounded corners of the can, thereby still more closely to fit and engage the can.

While the invention has been described in connection with a specific embodiment thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A condiment can having a body portion that is closed at its top by a rectangular-shaped top wall, and a removable rectangular-shaped cover adapted to fit over said top wall, said top wall having an opening therethrough and having a beading around its marginal edge, said cover being made of a resilient plastic material and being provided with gripping portions at its four corners to resiliently engage the four corners of said beading to resiliently hold the cover in place over said top wall, said cover having a perforated portion and a separate imperforate portion, and said cover being selectively positionable over said top wall with either its perforated or its imperforate portion registering with said opening.

2. A condiment can having a body portion that is closed at its top by a rectangular-shaped top wall, and a removable cap, adapted to be positioned over said top wall, said top wall having an opening therethrough the sides of which converge toward one corner of said top, said top wall also having a depression therein that is shaped like said opening, said cap having a perforated portion and an imperforate portion, said imperforate portion having a flange depending therebeneath the sides of which converge and that is shaped like said opening, said cap being removable and turnable end for end to selectively dispose said perforated portion or said imperforate portion in registry with said opening, said depending flange engaging in said opening or in said depression depending upon the position of said cap on said top wall, said cap having additional resilient means for resiliently holding said cap over said top wall in either of its positions.

3. A condiment can having a body portion that is closed at its top by a rectangular-shaped top wall, and a rectangular-shaped removable cap adapted to be positioned over said top wall, said top wall having an opening therethrough the sides of which converge toward one corner of said top wall and having a depression shaped like said opening and the sides of which converge toward the diagonally opposite corner of said top wall, said cap having a perforated portion and an imperforate portion, said imperforate portion having a flange depending therebeneath which is shaped like said opening, said cap being removable and turnable end for end to position said perforated portion in registry with said depression and said imperforate portion in registry with said opening and vice-versa, said flange being resilient to grip the sides of said opening or of said depression depending upon the position of said cap.

4. A condiment can as claimed in claim 3 having additional resilient means for resiliently holding said cap over said top wall in either of its positions.

5. A condiment can having a body portion that is closed at its top by a rectangular-shaped top wall, and a removable cap adapted to be positioned over said top wall, said top wall having a crescent-shaped opening therethrough one side of which is straight and which is bounded by a downwardly depending wall, said opening being disposed so that its sides converge toward one corner of said top wall, said top wall having a crescent-shaped depression therein which is diagonally disposed so that its sides converge toward that corner of said top wall which is diagonally opposite the first-named corner, said opening and said depression being of equal area and the same shape, said cap having a perforated portion and an imperforate portion, said cap having crescent-shaped flanges depending beneath both said perforated portion and said imperforate portion and which are shaped to fit snugly into both said opening and said depression, said cap being removable and turnable end for end to position said perforated portion in registry with said depression and said imperforate portion in registry with said opening and vice-versa, said cap being made of a resilient plastic material and having means for resiliently holding it over said top wall in either of its positions.

6. A condiment can having a top wall, and a cap adapted to be positioned over said top wall, said top wall having a crescent-shaped opening therethrough which is bounded by a downwardly depending wall and one side of which is straight, said top wall also having a crescent-shaped depression therein, one side of which is straight, said opening and said depression being so disposed in said top wall that their straight sides face one another, said opening and said depression being of approximately equal area and of the same shape, said cap having a perforated portion and an imperforate portion, said cap having crescent-shaped flanges depending beneath both said perforated portion and said imperforate portion and which are shaped to fit snugly into both said opening and said depression, said cap being turnable to position said perforated portion in registry with said depression and said imperforate portion in registry with said opening and vice versa.

References Cited in the file of this patent
UNITED STATES PATENTS

| | | |
|---|---|---|
| 961,991 | Ullrich | June 21, 1910 |
| 1,206,535 | Helson | Nov. 28, 1916 |
| 2,108,045 | Dirker | Feb. 15, 1938 |
| 2,235,987 | Frank | Mar. 25, 1941 |
| 2,815,893 | Frank | Dec. 10, 1957 |